United States Patent [19]

Yeaton et al.

[11] 4,316,326

[45] Feb. 23, 1982

[54] STYLUS FOR WRITING BRAILLE

[76] Inventors: Arthur B. Yeaton; Seth A. Yeaton, both of 112 Elm St., East Longmeadow, Mass. 01028

[21] Appl. No.: 146,666

[22] Filed: May 5, 1980

[51] Int. Cl.³ .............................................. B26F 1/00
[52] U.S. Cl. ..................................... 30/366; 30/164.9; 81/9.2; 434/115
[58] Field of Search ................. 30/366, 368, 358, 363, 30/164.9; 81/9.2; 434/115

[56] References Cited

U.S. PATENT DOCUMENTS

| 450,224 | 4/1891 | Dick | 30/358 |
|---|---|---|---|
| 621,767 | 3/1899 | Hachmann | 30/358 |
| 1,775,380 | 9/1930 | Wilson | 30/164.9 |
| 1,896,580 | 2/1933 | Gilmore | 30/368 |
| 2,417,946 | 3/1947 | Prentice | 145/65 |
| 2,418,984 | 4/1947 | Payne | 30/368 |
| 3,601,893 | 8/1971 | Knox | 30/164.9 |
| 3,619,828 | 11/1971 | Ogilby | 30/366 |
| 4,205,438 | 6/1980 | Sikorski | 30/164.9 |

FOREIGN PATENT DOCUMENTS

| 17728 | 4/1882 | Fed. Rep. of Germany | 30/366 |
|---|---|---|---|
| 368633 | 2/1923 | Fed. Rep. of Germany | 30/366 |

*Primary Examiner*—Stephen G. Kunin
*Assistant Examiner*—J. T. Zatarga
*Attorney, Agent, or Firm*—Chapin, Neal & Dempsey

[57] ABSTRACT

A stylus for writing braille by hand is provided. The stylus has a longitudinally extending handle, an arm attached to the handle with an angularly offset, pointed end for making braille impressions in paper, and a pressure pad attached to the arm for supporting a user's finger. The handle is specially configured to locate the user's hand to a uniform gripping position during use of the stylus while the pad acts in conjunction with the user's index finger for applying downward pressure on the pointed end of the stylus.

4 Claims, 4 Drawing Figures

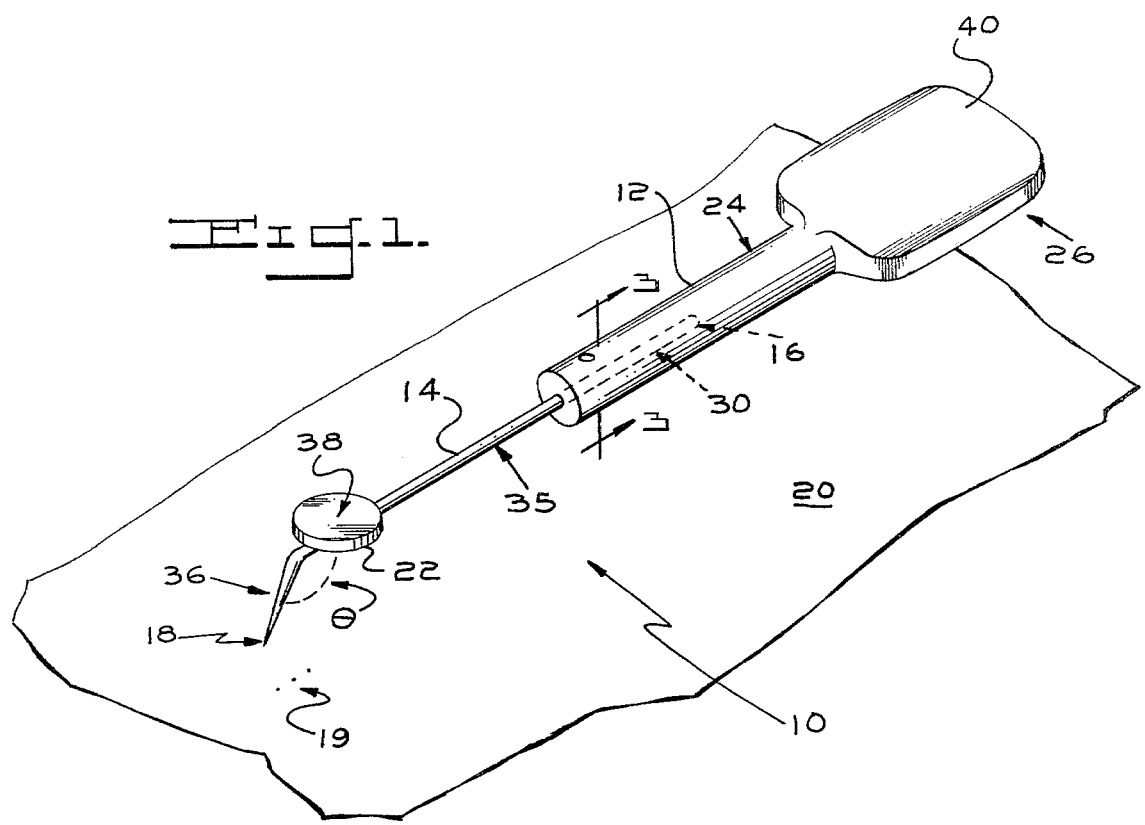
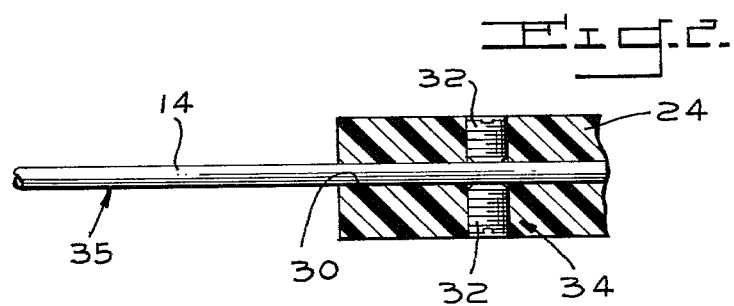
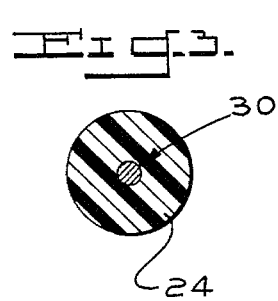
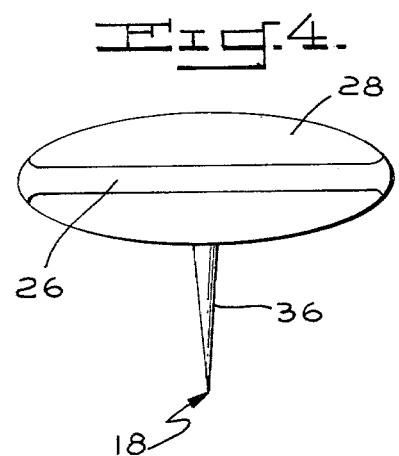

STYLUS FOR WRITING BRAILLE

BACKGROUND OF THE INVENTION

The present invention relates generally to a stylus for making impressions in sheet material. More particularly, the invention relates to a hand-held stylus for forming braille impressions in paper.

Braille is a system of writing for the sightless by using characters formed of six-dot arrays. The arrays involve two adjacent columns with three dots in each column, such that each dot of one column is horizontally aligned with an associated dot of the other column. The characters are each formed by raising a selected combination of the dots. For example, the letter "a" is characterized by a single raised dot in the first or uppermost row of the lefthand one of the two columns. The letter "c" is characterized by a raised dot in each first row of the two columns.

In order for a sightless person to easily distinguish different braille letters from one another, the arrays of raised dots must be correctly aligned, both vertically and horizontally.

SUMMARY OF THE INVENTION

The present invention is a stylus that permits a user to form accurately aligned arrays of braille dots. Briefly stated, the invention comprises a handle and a stylus rod or arm having a shank that is fixedly received within a bore of the handle. The arm includes an angularly offset, tapered portion with a pointed free end for punching dots in a material. In the preferred embodiment, an enlarged flange or pad is provided adjacent the pointed end of the arm to provide means by which the index finger may be used to manipulate the stylus as by pressing downwardly on the pad. In the preferred embodiment, the handle includes an enlarged flange portion at its outer end which serves to locate the user's hand to a uniform gripping position with the last three fingers of the hand wrapped around the cylindrical portion and the base of the metacarpal portion of the upper surface of the flange. With the handle so gripped and with the tip of the index finger on the pad, the stylus will be correctly held for braille writing.

The principal object of this invention is to provide an improved stylus for writing braille which, while being of simple and economical construction, is effective and easy to use.

Another object of this invention is to provide a stylus of the above type having a novel configuration such that a sightless person could readily and uniformly grip the stylus in the correct writing attitude.

The above and other objects and advantages of this invention will be more readily apparent from the following description taken in conjunction with the accompanying drawings in which:

FIG. 1 is a perspective view of a stylus constructed in accordance with the present invention;

FIG. 2 is a fragmentary, cross-sectional view showing a portion of the stylus;

FIG. 3 is a cross-sectional view of the stylus handle taken along line 3—3 of FIG. 1, with the stylus arm removed from the handle; and FIG. 4 is an end elevational view of the FIG. 1 stylus viewed from its handle end.

DETAILED DESCRIPTION OF THE PREFERRED EMBODIMENT

Referring to the drawings, a stylus for writing braille is illustrated in FIG. 1 and generally designated by the reference numeral 10. The stylus includes a handle 12 and a rod or arm 14. One end 16 of the arm 14 is removably received within the handle 12, while the other end 18 is pointed for punching dots 19 such as in a piece of paper 20. A flange or pad 22 is provided on the upper surface of the rod 14 adjacent its outer end. The pad provides means by which the pointed end 18 of the stylus is pressed into the paper using the tip of the index finger. The pad 22 and handle used in conjunction enable the sightless user to easily grip and manipulate the stylus 10 during braille writing.

As best shown in FIG. 1, the handle 12 has a cylindrical portion 24 and an integral, flat outer end portion 26. The two handle portions 24, 26 are interconnected by a curved portion 28 (see FIG. 4). The stylus 10 is gripped by wrapping the fingers of the writing hand around the cylindrical portion 24 while resting the palm portion against the enlarged flattened end portion 26. In this manner, the flat end portion will uniformly locate the user's grip.

Referring to FIGS. 1–3, the cylindrical handle portion 24 includes a central, longitudinally extending bore 30 for receiving one end of the rod 14. A pair of set screws 32 are mounted within a transverse, threaded bore 34 and are tightened to retain the rod 14 securely within the handle.

The stylus arm 14 includes a straight shank portion 35 in axial alignment with handle 12 and a tapered portion 36 angularly offset with the shank portion. The tapered portion is disposed at an oblique angle/$\theta$ of approximately 110° (one hundred ten degrees) relative to the longitudinal axis of the shank portion 35.

The pressure pad 22 may be affixed to the shank 34 in any suitable manner such as by spot welding adjacent the junction of the shank and the tapered portion 36. The pad has an upper surface 38 that lies in a plane substantially parallel to the upper surface 40 of the enlarged outer end portion 26 of the handle 12. This arrangement provides a very convenient and confortable means for holding and manipulating the stylus during braille writing. Moreover, the user can readily assume the same writing grip on each occasion and during usage can be assured that stylus retains a uniform writing position or attitude for uniform writing results.

While a preferred embodiment of the present invention has been described, it will be understood to those skilled in the art that changes and modifications may be made in the preferred embodiment without departing from the spirit of the invention. Accordingly, reference should be made primarily to the appended claims, rather than to the description of the preferred embodiment, to determine the scope of the invention.

Having thus described the invention, what is claimed is:

1. A stylus for writing braille comprising:
    (a) a handle having a horizontally enlarged outer end portion of generally plate-like configuration for locating the metacarpal portion of the user's hand when writing braille;
    (b) a unitary stylus arm extending from the inner end portion of the handle, said arm having an angularly offset, pointed end portion for making braille impressions on paper; and (c) an actuator pad for transmitting finger tip pressure exerted by the user of the stylus to said pointed end to manipulate the pointed end to make said braille impressions, said pad disposed adjacent to said offset portion of the stylus arm and being generally parallel to the upper surface of the enlarged portion of the handle for accomodating a finger tip of the user when the handle is gripped between the metacarpal portion and the small fingers of the user's hand.

2. The stylus of claim 1 wherein the inner portion of the handle is of rod-like configuration and with said stylus extending therefrom, the inner portions of said handle having a length and diameter to provide for gripping with the small fingers of the user's hand.

3. The stylus of claim 1 wherein the stylus further includes means for adjusting the length of sais stylus arm to change the distance from the enlarged portion of the handle and said actuator pad for the particular size of the user's hand so that the tip of the index finger will register with said pad when the metacarpal portion of the user's hand rests upon the upper surface of said enlarged portion.

4. A stylus comprising:
(a) a handle having a central bore;
(b) a stylus arm attached to the handle, said arm having a shank end fastened within the bore;
(c) the arm having an angularly offset portion with a pointed terminal end for making braille impressions;
(d) an actuator pad for transmitting the user's fingertip pressure to said pointed end to make said braille impressions, said pad being disposed on the upper surface of the arm adjacent said offset portion for registering with the tip of the user's index finger; and
(e) means to selectively adjust the length of said arm to change the distance from the handle to said pad to accommodate the size of a user's hand, said adjustment means including a fastener to permit a variance of the depth that the shank end is fixedly received within the bore.

* * * * *